(12) United States Patent
Aoki et al.

(10) Patent No.: US 8,170,631 B2
(45) Date of Patent: *May 1, 2012

(54) FOLDING ELECTRONIC DEVICE WITH CONTINUOUS DISPLAY

(75) Inventors: Paul M. Aoki, Berkeley, CA (US); Allison G. Woodruff, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/845,015

(22) Filed: Jul. 28, 2010

(65) Prior Publication Data

US 2010/0289730 A1 Nov. 18, 2010

Related U.S. Application Data

(63) Continuation of application No. 11/646,710, filed on Dec. 28, 2006, now Pat. No. 7,787,917.

(51) Int. Cl.
*H04M 1/00* (2006.01)
(52) U.S. Cl. ............... 455/575.3; 455/575.2; 455/575.1; 455/575.4; 455/90.3; 455/566; 361/679.56
(58) Field of Classification Search ............... 455/575.3, 455/575.2, 575.1, 575.4, 90.3, 566; 361/679.56
See application file for complete search history.

(56) References Cited

U.S. PATENT DOCUMENTS

| | | | |
|---|---|---|---|
| 6,262,785 | B1 | 7/2001 | Kim |
| 6,377,324 | B1 | 4/2002 | Katsura |
| 6,510,325 | B1 | 1/2003 | Mack, II et al. |
| 6,661,404 | B1 | 12/2003 | Sirola et al. |
| 6,876,876 | B2 | 4/2005 | Uhlemann |
| 7,050,293 | B2 | 5/2006 | Arbisi et al. |
| 7,085,596 | B2 | 8/2006 | Yu et al. |
| 7,496,378 | B2 * | 2/2009 | Kawamura ............... 455/556.1 |
| 7,558,057 | B1 | 7/2009 | Naksen et al. |
| 7,787,917 | B2 | 8/2010 | Aoki et al. |
| 2003/0144034 | A1 | 7/2003 | Hack et al. |

(Continued)

FOREIGN PATENT DOCUMENTS

JP 2002247164 A 8/2002

(Continued)

OTHER PUBLICATIONS

Suo, J. et al., "Mechanics of Rollable and Foldable Film-on-Foil Electronics", Applied Physics Letters, vol. 74, No. 8, Feb. 22, 1999, pp. 1177-1179.

(Continued)

*Primary Examiner* — Sanh Phu
(74) *Attorney, Agent, or Firm* — Ryder, Lu, Mazzeo and Konieczny, LLC; Douglas J. Ryder

(57) ABSTRACT

In general, in one aspect, the disclosure describes an apparatus that includes two panels pivotally connected together. The panels can pivot from an open arrangement where the two panels lay side by side to a closed arrangement where the two panels lay one on top of another. The apparatus also includes a flexible display connected to the two panels and having a portion that is mechanically free from the two panels. The apparatus further includes a cavity to receive at least a portion of the free portion of the display when the panels are pivoted into the closed arrangement.

20 Claims, 5 Drawing Sheets

U.S. PATENT DOCUMENTS

| | | |
|---|---|---|
| 2004/0057577 A1 | 3/2004 | Tutikawa |
| 2004/0198458 A1 | 10/2004 | Kawamura |
| 2005/0040962 A1 | 2/2005 | Funkhouser et al. |
| 2005/0041012 A1 | 2/2005 | Daniel et al. |
| 2005/0110702 A1 | 5/2005 | Aoki et al. |
| 2006/0125784 A1 | 6/2006 | Jang et al. |
| 2006/0166713 A1 | 7/2006 | Yeh et al. |
| 2007/0004475 A1 | 1/2007 | Kuo et al. |

FOREIGN PATENT DOCUMENTS

| | | |
|---|---|---|
| JP | 2003198689 A | 7/2003 |
| JP | 2006174506 A | 6/2006 |
| JP | 2006287982 A | 10/2006 |
| TW | 592337 | 6/2004 |
| TW | 200704110 | 1/2007 |
| WO | 20081083361 A1 | 7/2008 |

OTHER PUBLICATIONS

International Search Report and Written Opinion for PCT Application No. PCT/US 2007/089163, mailed on Apr. 15, 2008, 10 Pages.

International Preliminary Report on Patentability Received for PCT Application No. PCT/US2007/089163, mailed on Jul. 9, 2009, 6 pages.

Office Action received for Taiwan Patent Application No. 96144925, mailed on Jul. 13, 2010, 6 pages of Office Action and 1 page of English Translation.

* cited by examiner

FOLDING ELECTRONIC DEVICE WITH CONTINUOUS DISPLAY

BACKGROUND

Electronic devices are getting smaller all the time. The reduction in size of the device is followed by reduction in the size of a display that is utilized by the device. Shrinking the display too much reduces the amount of information that can be presented and may reduce the functionality of the device. Devices that have two halves that fold together (clamshells) provide the ability to modify the footprint of the device. When the device is folded together it will reduce the dimensions of the device in the direction it is folded. When the devices are opened they may provide additional user interface area (e.g., a clamshell phone may provide access to a keypad and display when opened).

FIG. 1 illustrates an example clamshell device 100 made up of two panels 101, 102 connected together by a hinge assembly 103 that enables the device 100 to be folded-up. At least one of the panels 101, 102 includes a processor (CPU), memory, power and input/output components. Electrical signals and power are passed between the panels 101, 102. Conventional LCD displays include a rigid glass panel so they cannot span the panels 101, 102 and the hinge 103. Accordingly, to increase the display footprint in a clamshell device 100 each of the panels 101, 102 may include a display (displays 104, 105 respectively). The displays 104, 105 may be used to display different content. A Nintendo DS game is an example of a commercially available clamshell device that includes displays on each panel of the clamshell.

The example clamshell device 100 is acceptable when the individual displays 104, 105 are used for different purposes and the sizes of the individual displays 104, 105 are adequate for the respective purposes (e.g., Nintendo DS). However, the example clamshell device 100 does not provide a single, high-quality, integrated graphical image across the two displays.

BRIEF DESCRIPTION OF THE DRAWINGS

The features and advantages of the various embodiments will become apparent from the following detailed description in which.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
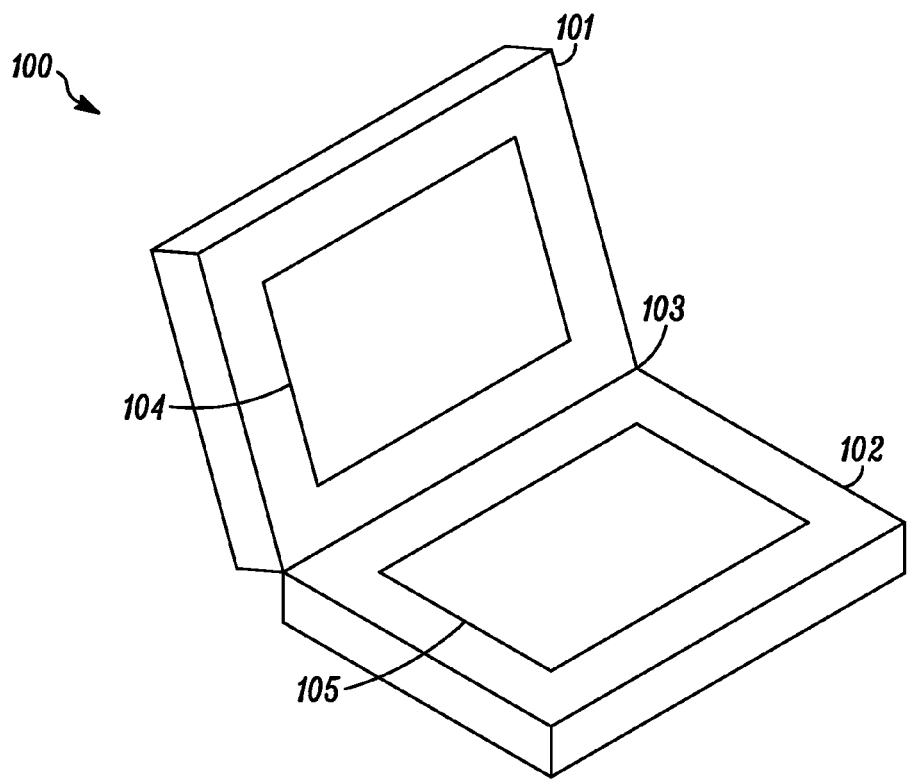
FIG. 1 illustrates an example prior art clamshell device, according to one embodiment.
Figure 2A:
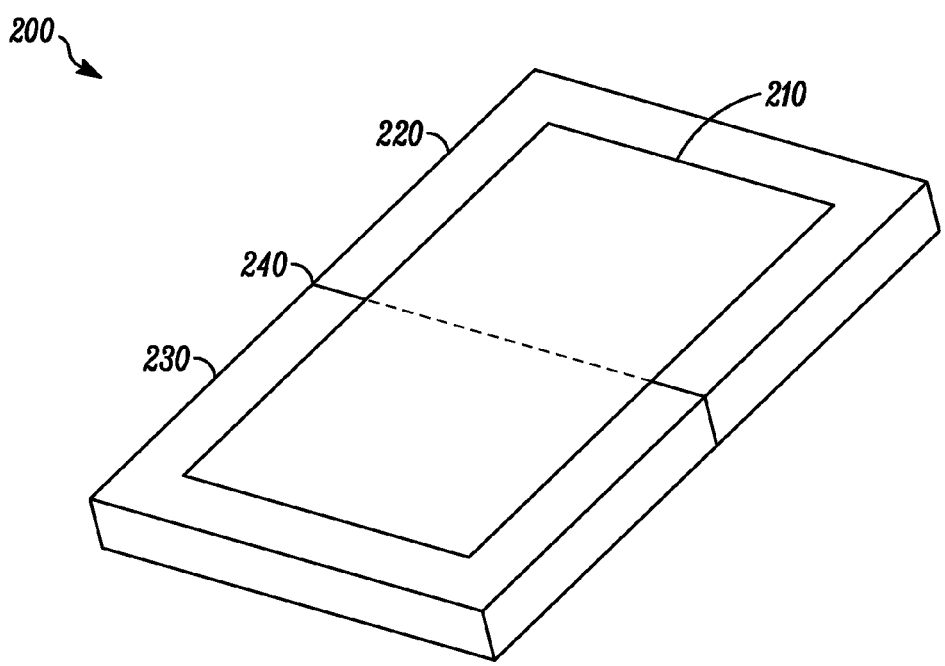
FIGS. 2A-B illustrate an example clamshell device having a single display, according to one embodiment.
Figure 2B:
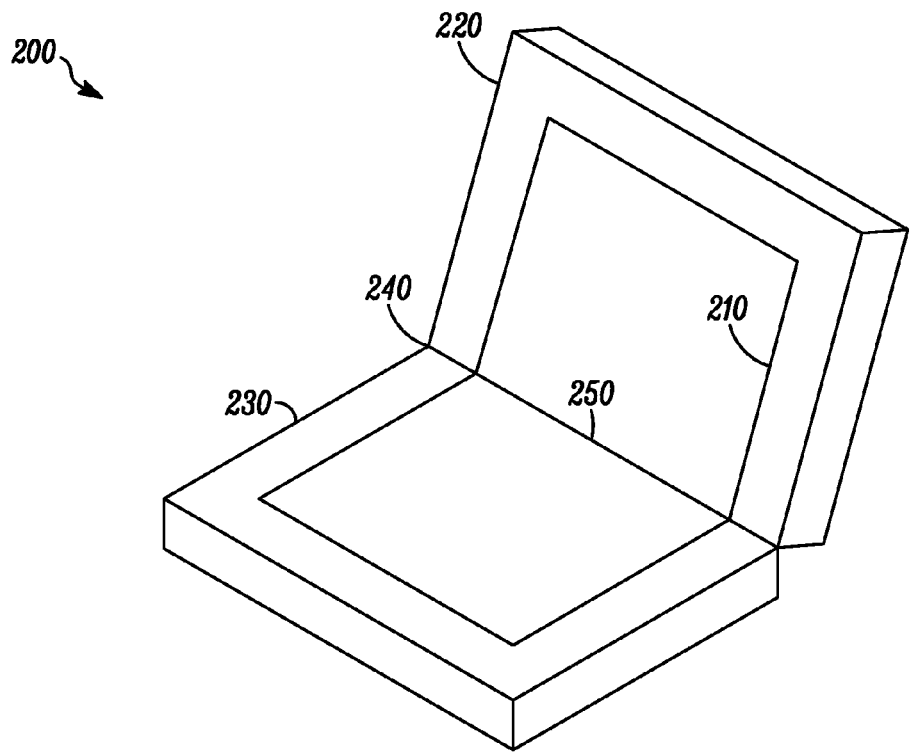

FIGS. 2A-B illustrate an example clamshell device 200 having a single display 210. The device 200 includes two panels 220, 230, a hinge assembly 240 connecting the panels 220, 230 and enabling the device 200 to close, and the display 210 extending across the two panels 220, 230 and the hinge assembly 240. The display 210 is a flexible display and may be constructed using display rendering materials that are flexible (e.g., organic light-emitting diodes (OLED)) and flexible display addressing circuitry (e.g., organic or inorganic transistor circuits). A variety of hinge mechanisms 240 may be used and are within the scope of the various embodiments described herein.

FIG. 2A illustrates the device 200 in an open position. In the open position the display 210 lays flat across the two panels 220, 230. FIG. 2B illustrates the device 200 being closed. When the device 200 is closed the display 210 folds over at or near the hinge assembly 240. The fold creates a small radius of curvature for the display 210 resulting in a region 250 of high mechanical stress. The high stress region 250 may cause delamination and/or failure of the display rendering materials and/or the addressing circuitry.

A clamshell device that provides a single display but eliminates or at least reduces the high stress region would make the use of clamshell devices having a single display practical. The high stress region may be reduced or eliminated by preventing the display from being folded flat and creating the damagingly small radius of curvature.

Figure 3:
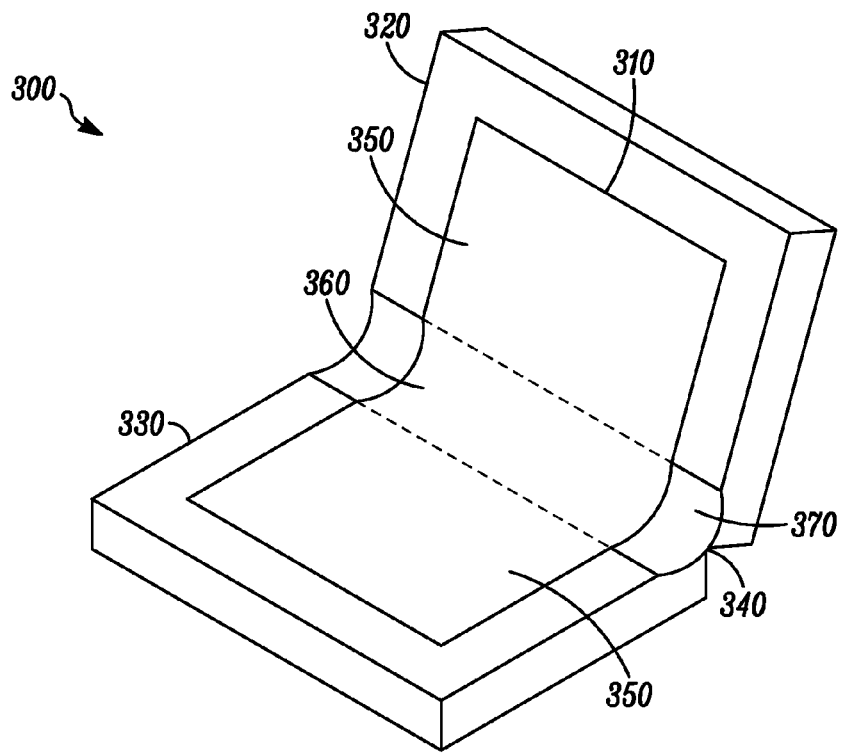
FIG. 3 illustrates an example single display clamshell device capable of avoiding a high stress region when the device is folded, according to one embodiment.

FIG. 3 illustrates an example single display 310 clamshell device 300 capable of avoiding a high stress region when the device 300 is folded. The device 300 includes panels 320, 330, the flexible display 310, and a hinge assembly 340. The display 310 is connected to outer portions 350 (fixed display portion) of the panels 320, 330 and is free from an inner portion 360 (free display portion) of the panels 320, 330. As illustrated, the free display portion 360 is between the dotted lines and the fixed display portions 350 are outside of the dotted lines (above top dotted line and below bottom dotted line). A cavity 370 may be formed at a center portion of the device 300. The center portion where the cavity 370 is formed may be within the inner portion 360. The cavity 370 may be formed by reducing the height of the panels 320, 330 at the center portion. The hinge assemble 340 allows for folding the panels 320, 330 and not blocking the cavity 370. When the device 300 is folded, at least a portion of the free display portion 360 may escape into the cavity 370, thus avoiding the damagingly small radius of curvature.

It should be noted that the diameter of the cavity 370 required to avoid strain-induced delamination does not necessarily need to be large (e.g., millimeters). The minimum diameter depends on factors such as the elastic modulus of the various materials.

When the device 300 is folded it is possible that the free display portion 360 may flex forward and not into the cavity 370. If the free display portion 360 flexed forward the display 310 may end up with at least one undesired fold when the panels 320, 330 are brought together when the system 300 is fully closed. The device 300 may include a guiding device (not illustrated) to ensure the display 310 enters the cavity 370. The guiding device may pull a portion of the free display portion 360 into the cavity 370 or may prevent the free display portion 360 from flexing forward. The guiding device may be located behind the display 310 or may be located in front of the display 310.

For example, the guiding device may be a restraint or tensioner attached between the free display portion 360 and the hinge assembly 340 so that it pulls a portion of the free display portion 360 into the cavity 370 when the device 300 is closed. For example, the guiding device may be a set of tabs or claws that extend over the free display portion 360, but that are not permanently attached thereto, that prevent the free display portion 360 from flexing forward when the device 300 is closed. Alternatively, the tabs or claws may pivot to descend on the free display portion 360 when the device 300 is closing so as to push a portion of the free display portion 360 into the cavity 370.

Figure 4A:
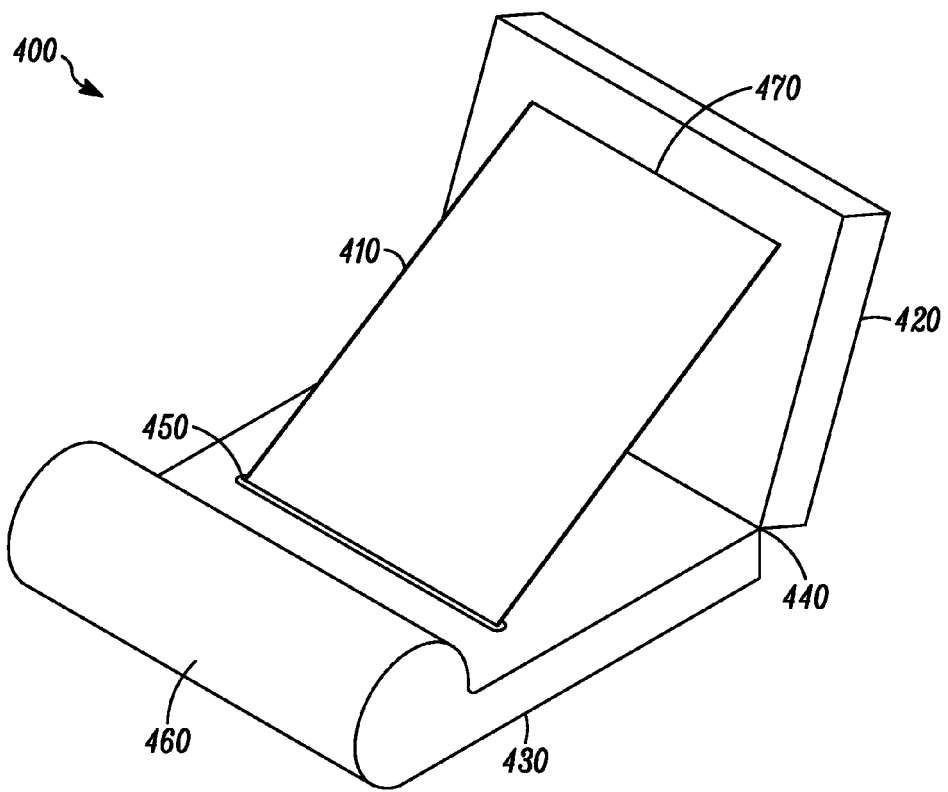
FIG. 4A illustrates an example clamshell device where a display is not folded between panels when the device is closed, according to one embodiment.

FIG. 4A illustrates an example clamshell device 400 where a display 410 is not folded between panels 420, 430 when the device 400 is closed. The device 400 includes the panels 420, 430, the flexible display 410, and a hinge assembly 440. A first panel 430 (lower panel) includes a slot 450 and an expanded portion 460. The display 410 is rigidly attached to a second panel 420 (upper panel) at connection point 470. The display 410 is tensioned and slides in and out of the slot 450 in the first panel 430 as the device 400 is folded and unfolded.

Figure 4B:
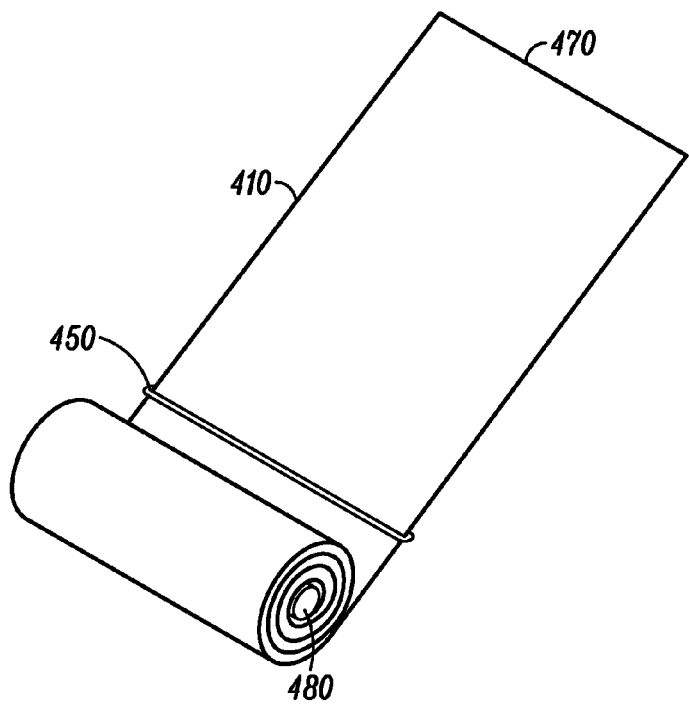
FIG. 4B illustrates an example roller used within an expanded portion the example clamshell device of FIG. 4A, according to one embodiment.

FIG. 4B illustrates an example roller 480 within the expanded portion 460 to house the display 410 when the device 400 is closed. The display 410 enters the slot 450 and wraps itself around the roller 480 as the device 400 is closed. Wrapping the display 410 around the roller 480 prevents the display 410 from having a damagingly small radius of curvature when the device 400 is closed. The slot 450 and the expanded portion 460 in effect create a cavity and the roller 480 guides the display 410 into the cavity. When the device 400 is opened, the second panel 420 moves away from the slot 450 and roller 480. As the display 410 is rigidly attached at the connection point 470, the display 410 will unwind from the roller 480 as the device 400 is opened and the second panel 420 continues to move away. When the device 400 is fully opened and the panels 420, 430 lay flat (e.g., the ends abut at the hinge 440) the display 410 will also lay flat against the panels 420, 430.

Figure 5A:
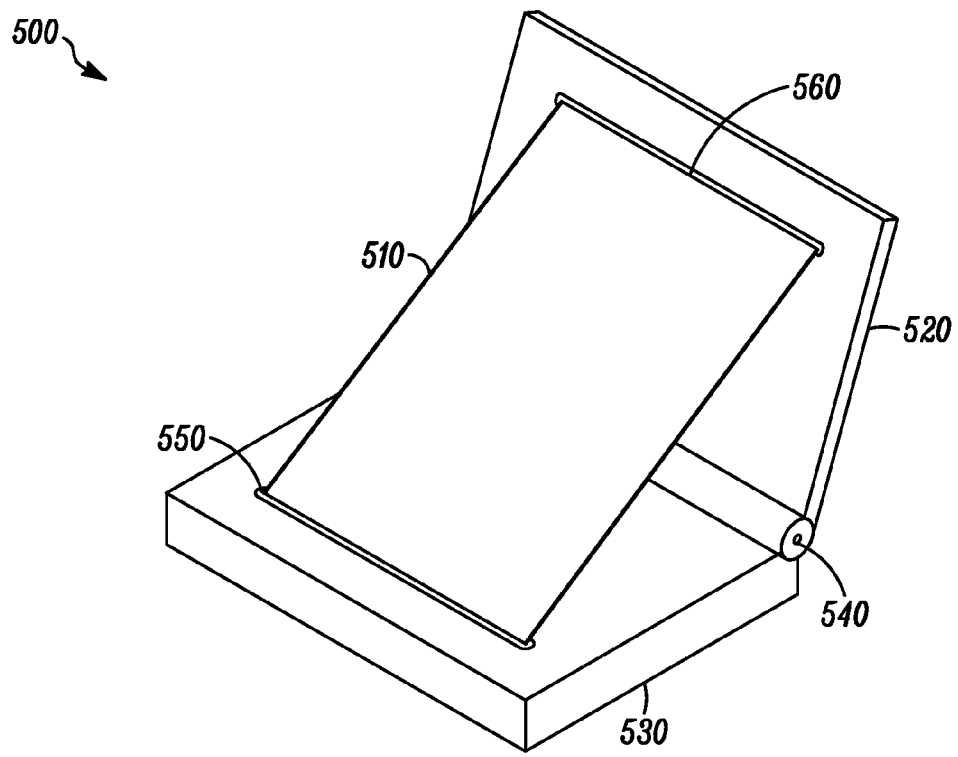
FIG. 5A illustrates an example clamshell device where a display is not folded between panels when the device is closed, according to one embodiment.

FIG. 5A illustrates an example clamshell device 500 where a display 510 is not folded between panels 520, 530 when the device 500 is closed. The device 500 includes the panels 520, 530, the flexible display 510, and a hinge assembly 540. A first panel 530 (lower panel) includes a slot 550. The display 510 is rigidly attached to a second panel 520 (upper panel) at connection point 560. The display 510 is tensioned and slides in and out of the slot 550 as the device 500 is folded and unfolded.

Figure 5B:
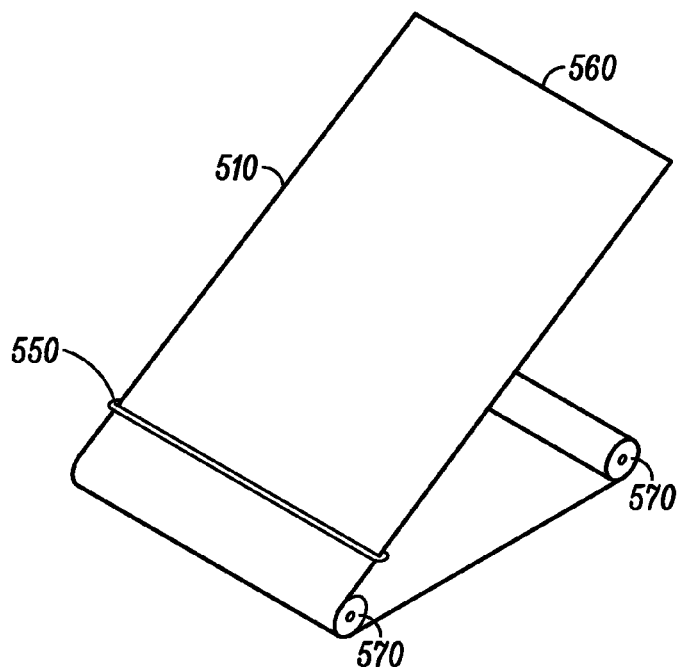
FIG. 5B illustrates an example roller system within the example clamshell device of FIG. 5A, according to one embodiment.

FIG. 5B illustrates an example roller system 570 (e.g., set of rollers) that runs laterally within the first panel 530. The display 510 is connected to the roller system 570. When the device 500 is closed, the display 510 enters the slot 550 and the roller system 570 rotates and guides the display 510 into an open area running laterally along the first panel 530. The slot 550 and the open area in effect create a cavity and the roller system 570 guides the display 510 into the cavity. When the device 500 is opened, the second panel 520 moves away from the slot 550. As the display 510 is rigidly attached at the connection point 560, the display 510 will be pulled out of the first panel 530, the roller system 570 will guide the display 510 out of the first panel 530 as the device 500 is opened and the second panel 520 continues to move away. When the device 500 is fully opened the display 510 will also lay flat against the panels 520, 530.

As illustrated in FIG. 5A, the second panel 520 is very thin. The second panel 520 may only provide mechanical functions relating to protecting and opening the device and may not contain any electrical circuitry. Accordingly, the hinge assembly 540 may be simplified because it need not contain any cables to pass electrical signals and power. A mechanical non-electrical panel (e.g., 520) is not limited to the device 500 of FIG. 5 and is not limited to top panels.

FIGS. 3-5 focused on clamshell devices having a display spanning two panels that did not have a damagingly small radius of curvature at the points where the panels fold over one another. However, the various embodiments disclosed herein are not limited to two-panel clam shell devices. Rather any number of panels could be used as long as the display avoided the damagingly small radius of curvature when folded. For example, if a cavity was formed at the points where the panels overlapped and the hinge permitted the display to enter the cavity (such as illustrated in FIG. 3).

Figure 6A:
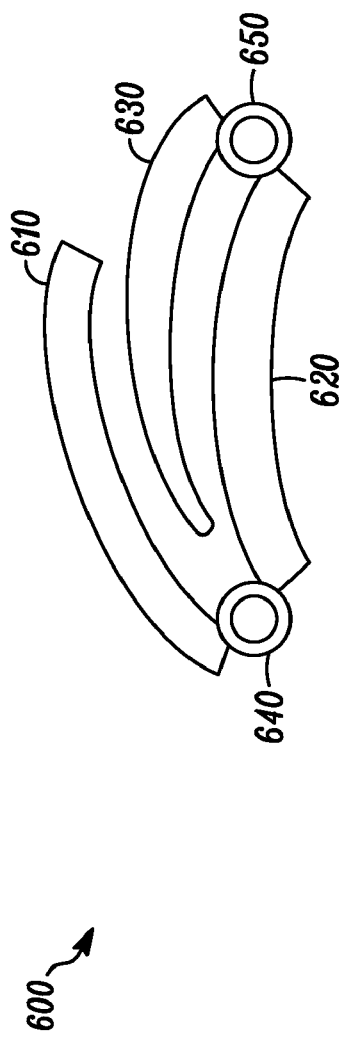
FIG. 6 illustrates an example three paneled clamshell device, according to one embodiment.
Figure 6B:
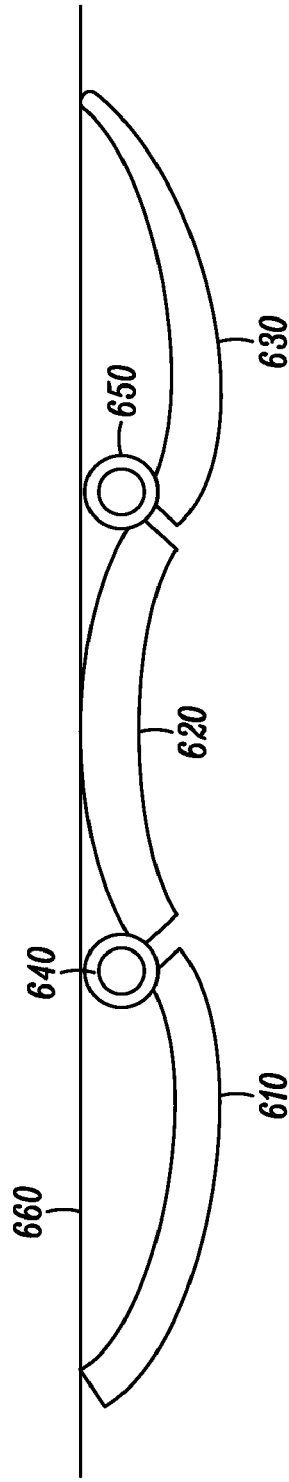

FIG. 6 illustrates an example three paneled clamshell device 600. The device 600 includes panels 610, 620, 630, two hinge assemblies 640, 650, and a single display 660 extending thereacross. The panels 610, 620, 630 are curved, the curves of the various panels 610, 620, 630 are such that the panels will lie on top of one another when folded (e.g., 630 onto 620). The display 660 is connected to outer panels 610, 630. When the device 600 is opened the display 660 may not follow the curvature of the panels 610, 620, 630, rather it may be nearly straight across from the points of connection and may contact a portion (e.g., center) of the middle panel 620. In order to keep the display 660 taut (avoid slack) the device 600 may include tensioners (not illustrated) to pull the display 660 toward the panels 610, 620, 630 when opened. Alternatively, the outer panels 610, 630 may be capable of opening further which may cause the display 660 to curve but would avoid slack.

As the display 660 does not follow curvature of the panels 610, 620, 630, the space between the display 660 and the panels 610, 620, 630 may act as a cavity that the display 660 can flow into when the device 600 is folded in order to avoid the damagingly small radius of curvature when folded. If the space is insufficient, if the panels are of a small width, or if the shape is such that folding results in a damagingly small radius of curvature, one or more of the hinges 640, 650 may need to be modified to have a cavity formed therein for the display 660 to flex into to avoid this.

The devices described above with respect to FIGS. 3-6 may be used for any number of purposes. For example, a clamshell device having a continuous display can be utilized in a variety of electronic devices, including but not limited to, handheld media playback devices, small Tablet PCs, mobile phones, and personal digital assistants (PDAs). The devices will include some type of processor for controlling the operation of the device. The device may include a user interface (e.g., keyboard, scroll bar, buttons) to allow the user to interface with the device. The device may be a mobile device and include a battery for providing power to the device. If the device is capable of communicating with other devices it may include an antennae.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. An apparatus comprising
a first and a second panel pivotally connected together at inner edges with a hinge assembly, wherein the first and the second panels can pivot from an open arrangement where the first and the second panels lay side by side to a closed arrangement where the first and the second panels lay one on top of another, and wherein a cavity is formed between the inner edges of the first and the second panels and the hinge assembly when in the closed arrangement; and
a flexible display connected to outer edges of the first and the second panels and mechanically free from the inner edges of the first and the second panels, wherein when in the open arrangement the flexible display extends over the first and the second panels and when in the closed arrangement the flexible display is located internal to the first and the second panels and a portion of the flexible display that is mechanically free enters the cavity to prevent the flexible display from being mechanically folded at a damagingly small radius of curvature at or around the inner edges.

2. The apparatus of claim 1, wherein the hinge provides electrical signals and power between the first and the second panels.

3. The apparatus of claim 1, further comprising a tensioner to guide the portion of the flexible display into the cavity in the closed arrangement.

4. The apparatus of claim 1, further including tabs to prevent the portion of flexible display from flexing out of the apparatus in the open arrangement.

5. The apparatus of claim 1, wherein one of the panels provides only mechanical functions relating to protecting and opening the apparatus.

6. The apparatus of claim 1, wherein the flexible display includes organic light-emitting diodes (OLEDs).

7. The apparatus of claim 1, wherein the flexible display includes organic transistor circuits.

8. The apparatus of claim 1, wherein the flexible display includes inorganic transistor circuits.

9. The apparatus of claim 1, wherein at lest one of the first panel and the second panel has a reduced height at the inner edge to create the cavity.

10. The apparatus of claim 1, wherein the hinge assembly pivotally connects the first panel and the second panel at sides on the inner edges thereof to not interfere with the cavity.

11. An apparatus comprising
a first and a second panel pivotally connected together at inner edges with a hinge assembly, wherein the first and the second panels can pivot from an open arrangement where the first and the second panels lay side by side to a closed arrangement where the first and the second panels lay one on top of another, and wherein the second panel includes a slot on an outer edge and a receiving portion in communication with the slot; and
a flexible display fixedly connected to an outer edge of the first panel, tension connected to the receiving portion of the second panel through the slot, and mechanically free from the first and the second panels therebetween, wherein when in the open arrangement the flexible display extends over the first and the second panels and when in the closed arrangement the flexible display is located internal to the first and the second panels and a portion of the flexible display that is mechanically free enters the receiving portion of the second panel through the slot.

12. The apparatus of claim 11, wherein the receiving portion includes a roller to wrap the flexible display around when the flexible display enters the receiving portion in the closed arrangement.

13. The apparatus of claim 12, wherein the receiving portion is formed on the outer edge of the second panel.

14. The apparatus of claim 11, wherein the receiving portion includes a roller system running laterally along bottom of the second panel to guide the flexible display into the second panel laterally along bottom when the flexible display enters the receiving portion.

15. The apparatus of claim 11, wherein the hinge provides electrical signals and power between the first and the second panels.

16. The apparatus of claim 11, wherein the first panel provides only mechanical functions relating to protecting and opening the apparatus.

17. The apparatus of claim 11, wherein the flexible display includes organic light-emitting diodes (OLEDs).

18. The apparatus of claim 11, wherein the flexible display includes organic transistor circuits.

19. The apparatus of claim 11, wherein the flexible display includes inorganic transistor circuits.

20. An electronic device comprising
a processor;
a battery;
a first and a second panel pivotally connected together at inner edges, wherein the first and the second panels can pivot from an open arrangement where the first and the second panels lay side by side to a closed arrangement where the first and the second panels lay one on top of another, and wherein a cavity is formed between the inner edges of the first and the second panels when in the closed arrangement; and
a flexible display connected to outer edges of the first and the second panels and mechanically free from the inner edges of the first and the second panels, wherein when in the open arrangement the flexible display extends over the first and the second panels and when in the closed arrangement the flexible display is located internal to the first and the second panels and a portion of the flexible display that is mechanically free enters the cavity.

* * * * *